(12) United States Patent
Watson et al.

(10) Patent No.: US 8,723,434 B2
(45) Date of Patent: May 13, 2014

(54) LED BULB FOR GENERAL AND LOW INTENSITY LIGHT

(75) Inventors: Calvin Hugh Watson, Austin, TX (US); Cheryl Lynn Heinsohn, Austin, TX (US)

(73) Assignee: Calvin Hugh Watson, Austin, TX (US)

( * ) Notice: Subject to any disclaimer, the term of this patent is extended or adjusted under 35 U.S.C. 154(b) by 102 days.

(21) Appl. No.: 13/452,623

(22) Filed: Apr. 20, 2012

(65) Prior Publication Data
US 2013/0278162 A1 Oct. 24, 2013

(51) Int. Cl.
*H05B 37/02* (2006.01)
*F21L 4/02* (2006.01)

(52) U.S. Cl.
USPC ............................. 315/201; 362/184; 362/183

(58) Field of Classification Search
None
See application file for complete search history.

(56) References Cited

U.S. PATENT DOCUMENTS

| | | | | |
|---|---|---|---|---|
| 8,188,671 B2* | 5/2012 | Canter et al. | | 315/224 |
| 2006/0238136 A1* | 10/2006 | Johnson, III et al. | | 315/185 R |
| 2011/0133649 A1* | 6/2011 | Kreiner et al. | | 315/86 |
| 2011/0193482 A1* | 8/2011 | Jones | | 315/87 |

* cited by examiner

*Primary Examiner* — Crystal L Hammond

(57) ABSTRACT

A bimodal light emitting diode (LED) light bulb, method, and system having a form factor compatible with industry standard light bulb sockets provides general lighting when power is received via one or more light bulb electrical contacts, then as a different luminosity when power is removed from the contacts. A first subset of LEDs is powerable via the contacts for general light, while a second subset of LEDs is powerable via an energy storage device. Both subsets of LEDs are packaged in a replaceable light bulb. The energy storage device may comprise a capacitor or battery which may be charged when power is supplied via the contacts. In one embodiment, power to LEDs is controlled by a timer, motion sensor, light sensor, sound sensor, dimmer, voltage sensor, or manual switch. In another embodiment, an ambience generator emits fragrance or background sound. In another embodiment, LEDs are individually replaceable.

26 Claims, 6 Drawing Sheets

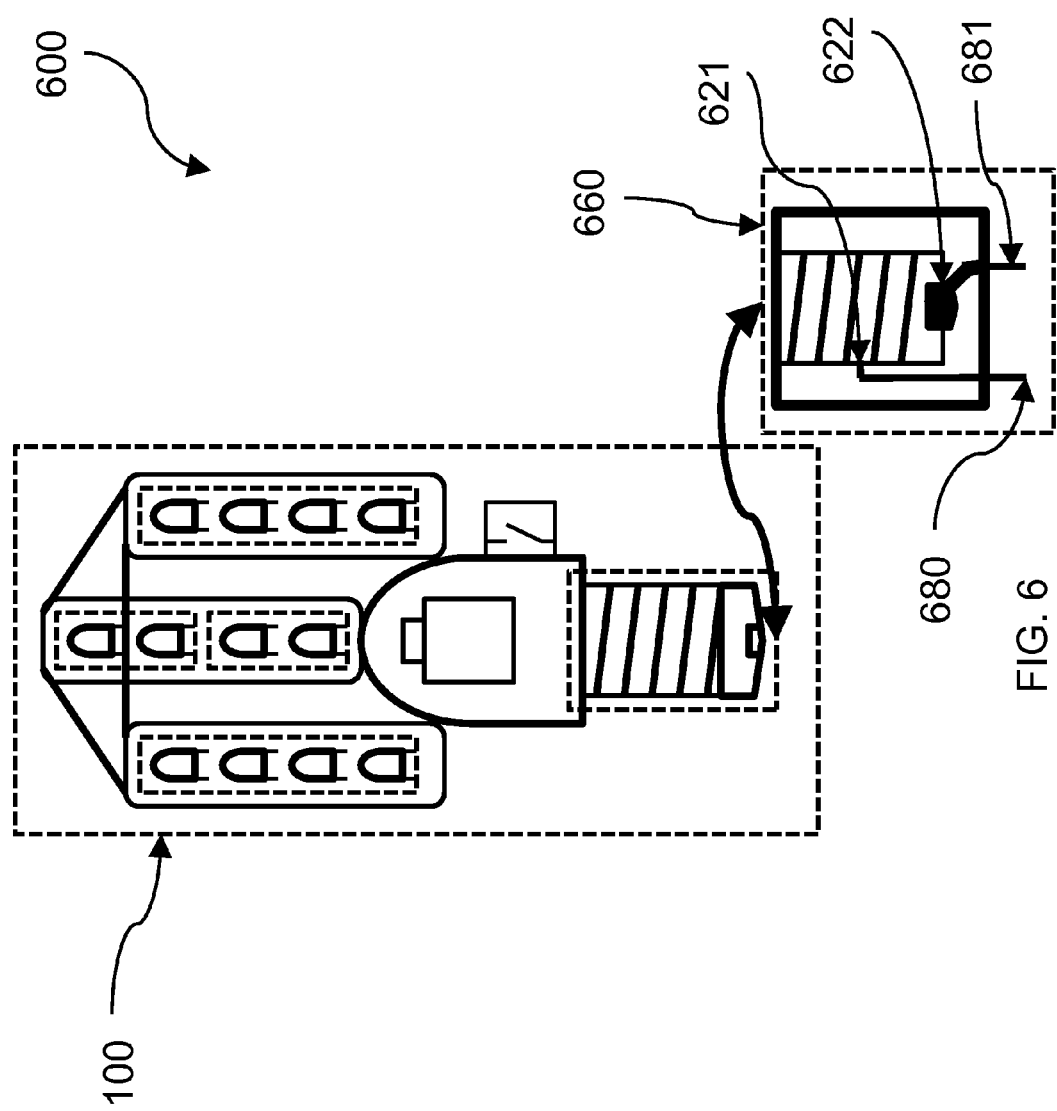

LED BULB FOR GENERAL AND LOW INTENSITY LIGHT

BACKGROUND

The most common types of light bulbs are incandescent, compact fluorescent lamp (CFL), and light emitting diode (LED). The incandescent light bulb design concept is a vacuum globe enclosing a conductive filament wire which glows when a current passes through. A CFL is shaped into a size similar to incandescent bulbs with a mercury vapor filled tube of glass excited by electricity, producing short-wave ultraviolet light through a phosphor coating which fluoresces to emit visible light. An LED bulb typically consists of several LED lamps grouped together to adjust light intensity, direction, color, or voltage. An LED bulb may be enclosed by glass or plastic resembling an incandescent bulb. Dimmable LED bulbs are available, but their cost may be prohibitive. Recent developments in both CFL and LED bulbs have allowed replacement of many incandescent bulbs by increasing life span and power efficiency.

Homes and businesses use multiple light bulbs or fixtures for general light and additionally may have a separate dedicated source when low intensity light is desired. Low intensity light is often used to provide enough light for people to see when traversing in the dark or to alleviate fear of the dark. While general light is usually implemented as a permanent ceiling, wall, or furniture fixture, low intensity light is typically implemented as a removable wall-mounted fixture referred to as a nightlight. Nightlights may be plugged into electrical receptacles in rooms, hallways, or entryways. Having separate solutions for general and low intensity light has a number of limitations. Separate implementation requires an excessive number of light fixtures. Low intensity light is less efficiently distributed through the area. Receptacles may not be available where needed, and receptacles are no longer available due to use by a nightlight. Electrical dangers for children are also a concern of separate low intensity light fixtures, due to low height and ease of removal.

Fragrance and sound generators improve the atmosphere of a room. Particularly at night, sleep can be enhanced when background noise or fragrance is emitted. Like nightlights they are also often wall-mounted fixtures and have similar drawbacks.

BRIEF DESCRIPTION OF THE DRAWINGS

The embodiments will be more readily understood in view of the following description with the accompanying drawings wherein like reference numerals represent like elements.

FIG. 6 illustrates an exemplary bimodal LED bulb system with a battery, a light bulb screw base, a switch, and a light bulb socket in accordance with another embodiment set forth in the disclosure.

DETAILED DESCRIPTION

Figure 1:
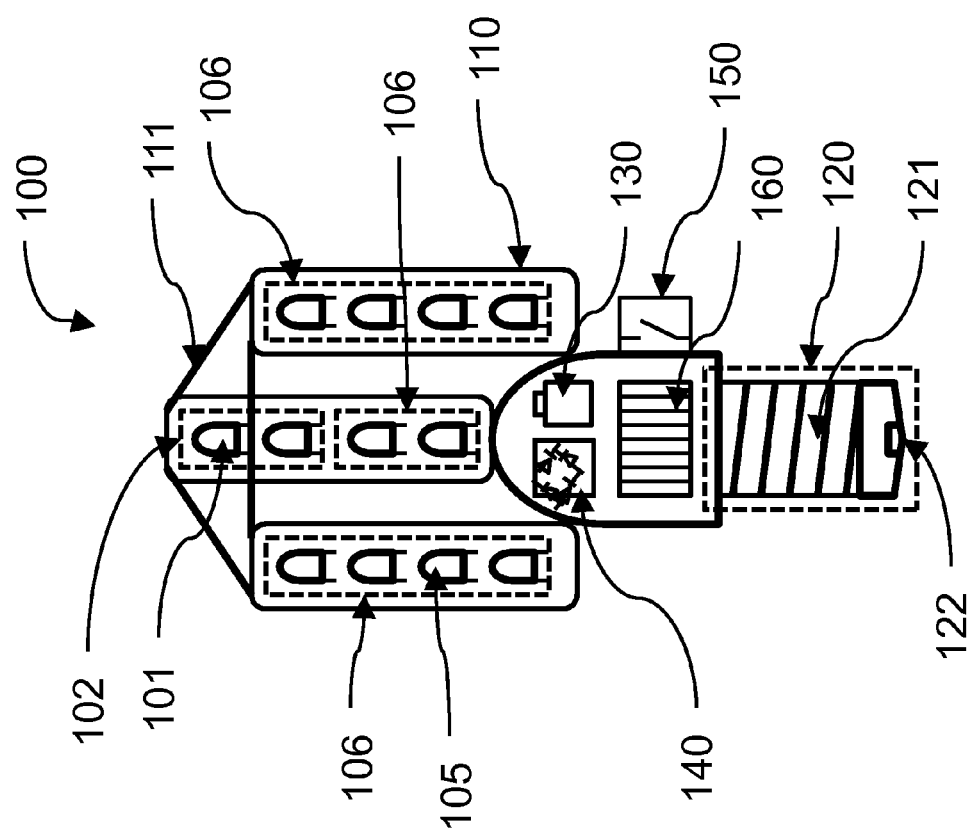
FIG. 1 illustrates an exemplary bimodal LED bulb with a battery, light bulb screw base, rectifier, solar panel, and switch in accordance with one embodiment set forth in the disclosure.

Various embodiments of the present invention are now described with reference to the figures. While specific combinations of elements are described, it should be understood that this is done for illustrative purposes only. A person skilled in the relevant art will recognize that other configurations can be used without departing from the scope of the invention.

The disclosure relates to an LED light bulb, method, and system for a lighting system which functions as a replaceable LED bulb for both general and low intensity light. The light bulb includes a plurality of LED bulbs and a base having a form factor compatible with industry standard light bulb sockets. General light is provided when power is supplied via one or more light bulb electrical contacts, then a different luminosity when power is removed from the one or more electrical contacts. A first subset of LEDs is powerable via the contacts, while a second subset of LEDs is powerable via an energy storage device. Both subsets of LEDs are packaged as a replaceable light bulb. The energy storage device may comprise a capacitor or battery which may be charged when power is supplied to the socket. In one embodiment, power to LEDs is controlled by a timer, motion sensor, light sensor, dimmer, voltage sensor, or manual switch. In another embodiment, an ambience generator emits fragrance or background sound. In another embodiment, LEDs are individually replaceable.

A wide range of standard form factors facilitate replacement of light bulbs. Specifications for light bulb (electric lamp) bases (caps) and sockets (lampholders) are largely overseen by two organizations. The American National Standards Institute (ANSI) is an organization that publishes C81.61 and C81.62, while International Electrotechnical Commission (IEC) publishes 60061-1 and 60061-2. Edison screw lamp base and lampholder examples include but are not limited to the E-series described in ANSI C81.61 and C81.62: E5 midget, E10 miniature, E11 mini-candelabra, E12 candelabra, E17 intermediate, E26/24 single-contact medium, E26d double-contact medium, E26/50x39 skirted medium, E26/53x39 extended skirted medium, E29/53x39 extended skirted admedium, E39 single-contact mogul, E39d double-contact mogul, EP39 position-oriented mogul, and EX39 exclusionary mogul. Multiple-pin lamp base and lampholder examples include but are not limited to the G-series described in ANSI C81.61 and C81.62: GY two-pin for T, G4 two-pin for single-ended TH, GU4 two-pin for MR11 GLS lamps, GZ4 two-pin for projection lamps, G5 fluorescent miniature two-pin, 2G7 four-pin compact fluorescent, GZ10 bipin, G16t three-contact lug for PAR lamps, G17t three-pin prefocus for incandescent projection lamps. Bayonet lamp base and lampholder examples include but are not limited to the B-series described in ANSI C81.61 and C81.62: B/BX8.4d small instrument panel, BA9/12.5 miniature, BAW9s for HY21W, BA15s candelabra single contact, BAZ15d double contact with offset, and BY22d multipurpose sleeved double contact.

FIG. 1 illustrates one example of an LED bulb 100 comprising a plurality of LEDs. Light bulb base 120 is an Edison screw industry standard socket wherein at least part of the base is metal and forms the electrical contact 121. Two sets of LEDs are shown, 102 and 106. Substrate 110 supports LED groups such as LED sets 102 and 106. LED set 106 comprises LEDs 105 which are powered via light bulb electrical contacts 121 and 122. LED 105 has an LED industry standard base such that an individual LED 105 can be replaced. LED set 102 comprises LEDs 101 which can also be individually replaced. LEDs 101 and 105 may be the same LED type. Rectifier 140 converts electricity from alternating current (AC) to direct current (DC). LED set 106 power is supplied via light bulb electrical contacts 121 and 122 through rectifier 140. Contacts 121 and 122 may also charge energy storage device 130 which is a battery in this embodiment. Solar panel 160 may instead charge battery 130. LED set 102 power is supplied via the battery or contacts 121 and 122 through rectifier 140. Switch 150 may configure power to LED set 102 from contacts 121 and 122 or from battery 130. LED set 102 may be a subset of LED set 106 when switch 150 configures power to LED set 102 to be supplied via contacts 121 and 122. Switch 150 can comprise a manual, light sensitive, sound sensitive, dimmer, voltage sensor, or timer switch. Frame 111 is part of the chassis holding LED bulb 100 together.

Light bulb 100 can provide both general and low intensity lighting in hallways, bedrooms, bathrooms, living rooms, or outdoors. Bulb 100 replaces ceiling (or lamp) fixtures for general light, and wall-mounted nightlights for low intensity light. Low intensity light conditions are improved with elevated locations of a fixture, and obstacles no longer block low intensity light as from a wall-mounted nightlight. Child safety is also improved with removal of wall-mounted nightlights.

Figure 2:
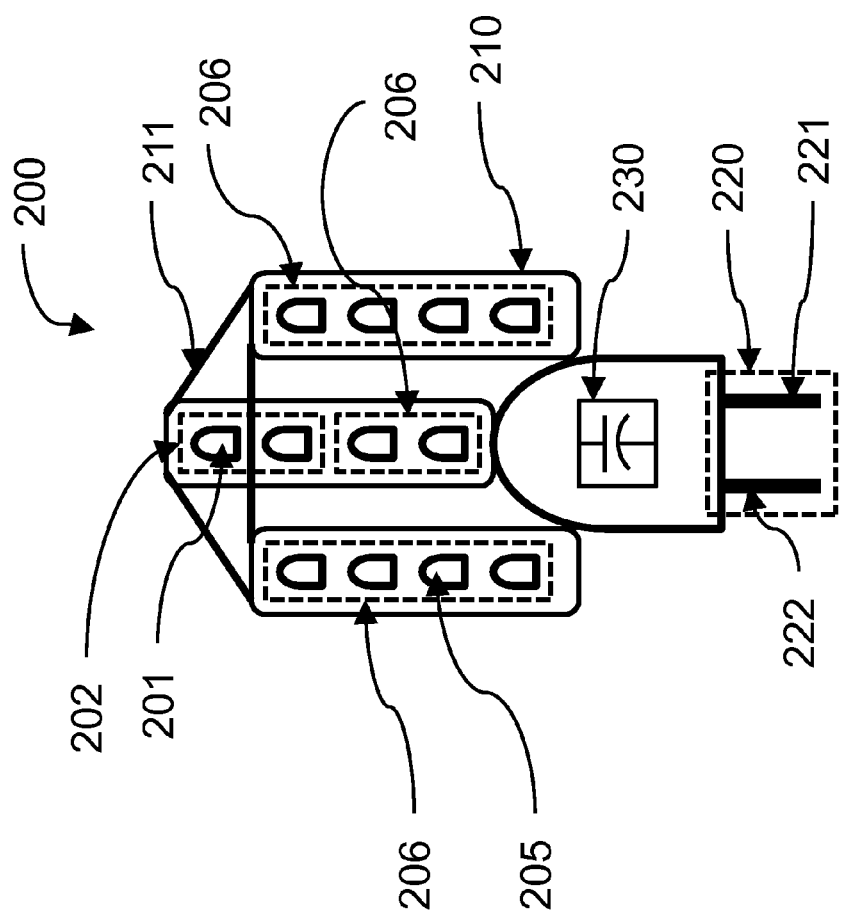
FIG. 2 illustrates of an exemplary bimodal LED bulb with a capacitor and light bulb multiple-pin base in accordance with another embodiment set forth in the disclosure.

FIG. 2 illustrates an example of an LED bulb 200 comprising a plurality of LEDs. Light bulb base 220 is compatible with a multiple-pin industry standard socket. Two sets of LEDs are shown, LED sets 202 and 206. Substrate 210 supports LED groups such as LED sets 202 and 206. LED set 206 comprises LEDs 205 and is coupled to light bulb electrical contacts 221 and 222 for power. LED set 202 comprise of LEDs 201. LEDs 201 and 205 may or may not be the same LED type. Energy storage device 230 is a capacitor charged via contacts 221 and 222 when power is supplied. LED set 206 is powered via contacts 221 and 222, and LED set 202 is powered via capacitor 230. Frame 211 is part of the chassis holding LED bulb 200 together.

Light bulb 200 is compatible with DC supply voltage situations. No rectifier is included. General light is emitted and capacitor 230 is charged when power is supplied via contacts 221 and 222. When power is removed from the contacts 221 and 222, LED set 202 remains on for a period of time as a low intensity light source via power supplied from capacitor 230. If used in an automobile application, low intensity light is available by LED set 202 after the power to contacts 221 and 222 is disabled.

Figure 3:
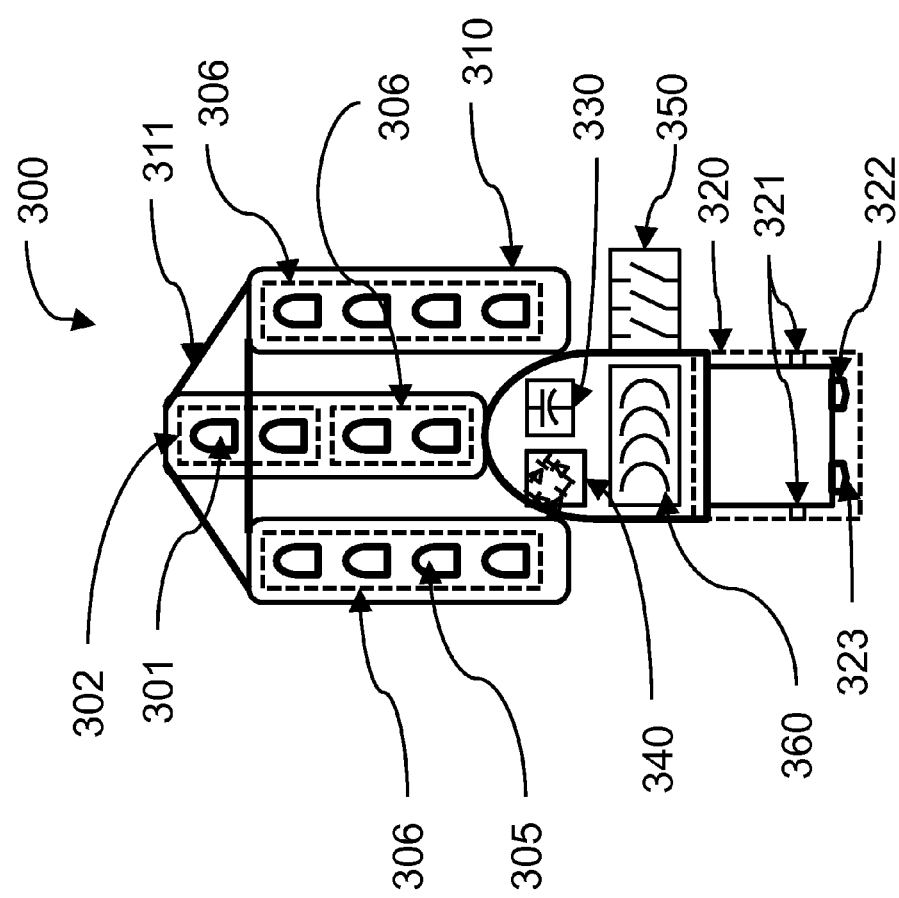
FIG. 3 illustrates of an exemplary bimodal LED bulb with a capacitor, rectifier, ambience generator, plurality of switches, and light bulb bayonet mount base in accordance with another embodiment set forth in the disclosure.

FIG. 3 illustrates another embodiment of an LED bulb 300 comprising a plurality of LEDs. Light bulb base 320 is compatible with a bayonet mount industry standard socket with pins 321 to fasten the base into the socket. Two sets of LEDs are shown, LED sets 302 and 306. Substrate 310 supports LED groups such as LED sets 302 and 306. LED set 306 comprises LEDs 305 which are coupled to light bulb electrical contacts 322 and 323. LED set 302 comprises LEDs 301. LEDs 301 and 305 may or may not be the same LED type. Rectifier 340 converts alternating current (AC) electricity from contacts 322 and 323 to direct current (DC) and charges energy storage device 330 which is a capacitor in this embodiment. LED set 306 is coupled to contacts 322 and 323 through rectifier 340 for power, and LED set 302 is coupled to capacitor 330 for power. Switch box 350 contains three switches. Switch box 350 has a first switch which may configure LED set 302 to be powered via contacts 322 and 323, or configure LED set 302 power to be supplied via capacitor 330. Switch box 350 has a second switch which may be used to power ambience generator 360. Ambience generator 360 may include a fragrance or sound generator. The third switch of switch box 350 may be a manual, light sensitive, sound sensitive, dimmer, voltage sensor, or timer switch to control the supply of power to LED set 302 or LED set 306. Frame 311 is part of the chassis holding LED bulb 300 together.

Ambience generator 360 serves to replace wall-mounted ambience generators in a similar way that LED set 302 replaces wall-mounted nightlights. Many of the same advantages are accomplished. A higher elevation can be achieved compared to a wall-mount, a wall receptacle is made available and child safety is improved.

Figure 4:
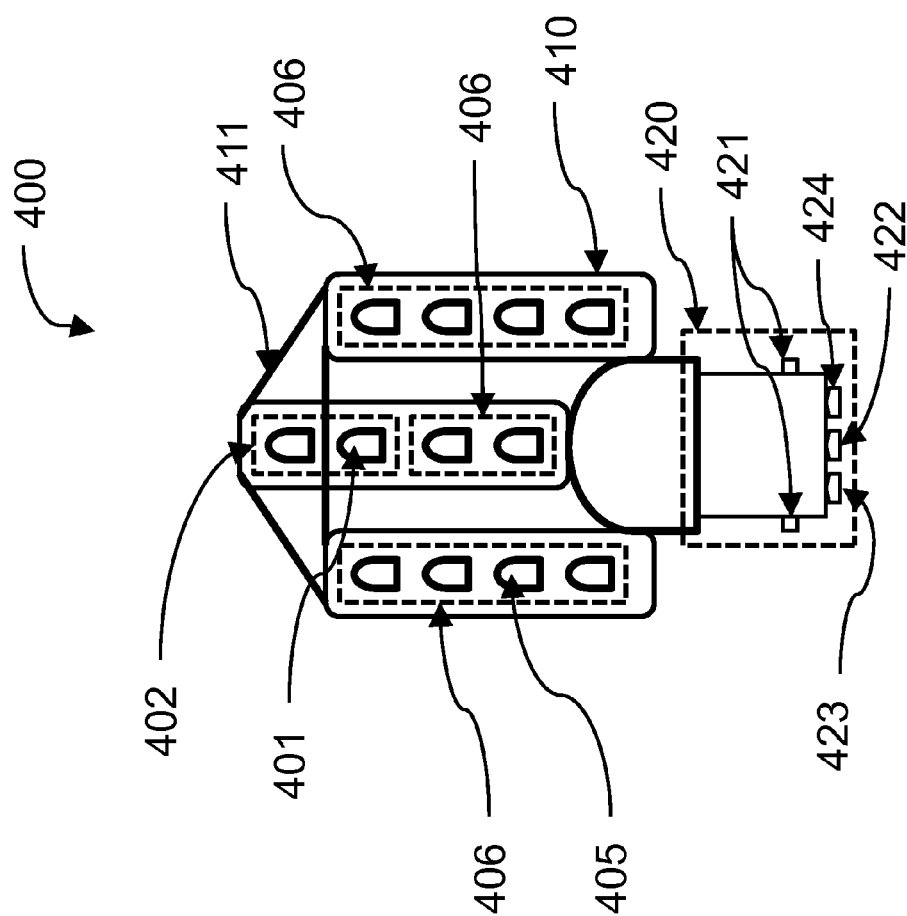
FIG. 4 illustrates of an exemplary bimodal LED bulb with a light bulb three-contact base to supply power independently to first and second subsets of LEDs in accordance with another embodiment set forth in the disclosure.

FIG. 4 illustrates yet another embodiment of an LED bulb 400 comprising a plurality of LEDs. Light bulb base 420 is compatible with a bayonet mount industry standard socket with pins 421. Two sets of LEDs are shown, LED sets 402 and 406. Substrate 410 supports LED groups such as LED sets 402 and 406. LED set 406 comprises LEDs 405 and is coupled to light bulb electrical contacts 422 and 423 to supply power. LED set 402 comprises LEDs 401 and is coupled to light bulb electrical contacts 422 and 424 to supply power. Contact 422 is the shared negative, neutral, or ground, and contacts 422 and 424 are positive or hot for supplying separate power to LED sets 402 and 406. LEDs 401 and 405 may be the same LED type. Frame 411 is part of the chassis holding LED bulb 400 together.

Light bulb 400 is compatible with DC supply voltage situations. No rectifier or energy storage device is packaged on the light bulb. A rectifier or energy storage device may be located external to the light bulb and supply power to contacts 422, 423, and 424. This embodiment provides flexibility in design choices for area or cost considerations, yet maintains most advantages of light bulb 100 in FIG. 1. It would be recognized by a person of ordinary skill in the art that a combination of light bulb 100 of FIG. 1 and light bulb 400 of FIG. 4 may include an energy storage device packaged in the light bulb.

Figure 5:
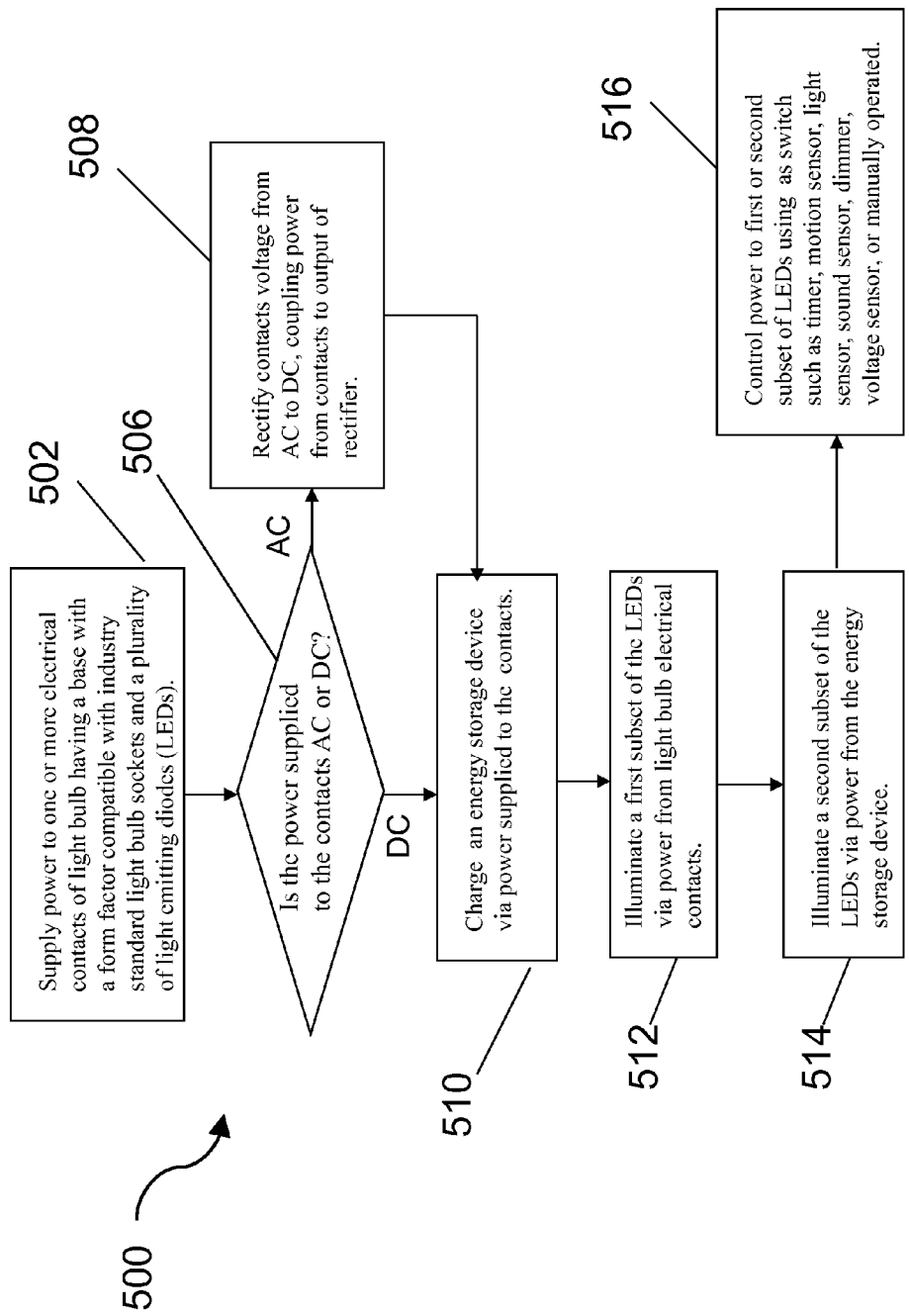
FIG. 5 illustrates a method of bimodal lighting in accordance with the embodiments.

FIG. 5 illustrates an embodiment of a bimodal lighting method 500 comprising a plurality of LEDs packaged in an LED light bulb having a base with a form factor compatible with one or more industry standard light bulb sockets. In step 502, power is supplied to one or more electrical contacts of the LED bulb. The power may be of AC or DC type. If power to the contacts is AC, rectify the incoming power to the light bulb contacts in step 508 such that DC power is supplied at the output of the rectifier which may be used by other devices internal to the light bulb. Step 508 may be skipped if DC power is supplied to the electrical contacts of the LED bulb. In step 510 charge an energy storage device via power supplied from the contacts. In step 512, illuminate a first subset of the plurality of LEDs via power supplied from the contacts. In step 514, illuminate a second subset of the plurality of LEDs via power supplied from the energy storage device. Step 516 describes controlling power to either the first subset, second subset, or both subsets of LEDs using a switch. The switch may be of various types including a timer, motion sensor, light sensor, sound sensor, dimmer, voltage sensor, or manual switch.

FIG. 6 illustrates an example of an LED bulb system 600 comprising LED bulb 100 from FIG. 1 and Edison screw industry standard light bulb socket 660. Socket electrical contacts 621 and 622 provide electrical power to LED bulb 100 by connecting to light bulb electrical contacts 121 and 122 when LED bulb 100 is fastened to light bulb socket 660. Metal interconnects 681 and 680 supply electrical power to contacts 621 and 622. A person of ordinary skill in the art would recognize that other combinations of compatible industry standard light bulb bases and sockets are possible.

The particular embodiments disclosed above are illustrative only, as the embodiments herein may be modified and practiced in different but equivalent manners apparent to those skilled in the art having the benefit of the teachings herein. Furthermore, no limitations are intended to the details of construction or design as shown herein, other than as described in the claims below. It is therefore evident that the particular embodiments disclosed above may be altered or modified and all such variations are considered within the scope of the claimed invention.

What is claimed is:

1. A light bulb comprising:
    a plurality of light emitting diodes (LEDs);
    a light bulb base having a form factor compatible with at least one industry standard light bulb socket;
    one or more light bulb base electrical contacts to supply power to a first subset of the plurality of LEDs; and
    an energy storage device to supply power to a second subset of the plurality of LEDs,
    wherein the energy storage device does not supply power to the first subset.

2. The light bulb of claim 1, wherein the energy storage device is charged via power supplied by the one or more light bulb electrical contacts.

3. The light bulb of claim 1, further comprising a rectifier to convert power supplied via the one or more light bulb electrical contacts from AC to DC.

4. The light bulb of claim 1, wherein at least one LED is included in each of the first subset and the second subset.

5. The light bulb of claim 1, wherein power to the second subset of LEDs is configurable to be supplied via the one or more light bulb electrical contacts.

6. The light both of claim 1, further comprising an ambience generator configured to emit at least one selected from a group consisting of fragrance and background sound.

7. The light bulb of claim 1, further comprising a switch to control power to at least one of the first and second subset of LEDs, the switch comprising at least one selected from a group consisting of: timer switch, motion sensor switch, light sensor switch, sound sensor switch, dimmer switch, voltage sensor switch, and manual switch.

8. The light bulb of claim 1, wherein the first subset of LEDs provide a first level of light, and the second subset of LEDs provide a second level of fight less luminous than the first level.

9. The light bulb of claim 1, further comprises one or more LED bases having a form factor compatible with industry standard LED sockets.

10. The light bulb of claim 9, wherein individual LEDS are replaceable.

11. A light bulb comprising:
    a plurality of light emitting diodes (LEDs); a light bulb base having a form factor compatible with industry standard light bulb sockets; wherein a first subset of the plurality of LEDs is coupled to a first power source via one or more light bulb base electrical contacts, and a second subset of the plurality of LEDs is coupled to a second power source; and
    wherein the first subset is not coupled to second power source.

12. The light bulb of claim 11, wherein the second power source comprises an energy storage device.

13. The light bulb of claim 11, wherein power to the second subset is configurable to be supplied via the one or more light bulb electrical contacts.

14. The light bulb of claim 11, further comprising a rectifier to convert power supplied via the one or more light bulb electrical contacts from AC to DC.

15. The light bulb of claim 11, further comprising a switch to control power to at least one of the first and second subset of LEDs, the switch comprising at least one selected from a group consisting of: timer switch, motion sensor switch, light sensor switch, sound sensor switch, dimmer switch, voltage sensor switch, and manual switch.

16. The light bulb of claim 11, wherein the first subset of LEDs provides a first level of light, and the second subset of LEDs provides a second level of light less luminous than the first level.

17. The light bulb of claim 11, further comprising one or more LED bases having a form factor compatible with industry standard LED sockets.

18. The light bulb of claim 17, wherein individual LEDs are replaceable.

19. In a system comprising a light bulb with a light bulb base having a form factor compatible with at least one industry standard light bulb socket, and a plurality of light emitting diodes (LEDs), a method comprising:
    receiving power at one or more light bulb base electrical contacts;
    illuminating a first subset of the plurality of LEDs via power supplied by the one or more light bulb base electrical contacts;
    illuminating a second subset of the plurality of LEDs via power supplied by an energy storage device; and
    wherein the first subset of LEDs and second subset of LEDs are packaged on the light bulb.

20. The method of claim 19, further comprising charging the energy storage device via power supplied by the one or more light bulb electrical contacts.

21. The method of claim 19, further comprising rectifying AC power from the light bulb socket to DC power.

22. The method of claim 19, further comprising controlling power to at least one of the first and second subset of LEDs by at least one selected from a group consisting:
    timer switch, motion sensor switch, light sensor switch, sound sensor switch, dimmer switch, voltage sensor switch, and manual switch.

23. A light bulb system comprising:
    a light bulb comprising as plurality of light emitting diodes (LEDs), a light bulb base, one or more light bulb base electrical contacts to supply power to a first subset of the plurality of LEDs, an energy storage device to supply power to a second subset of the plurality of LEDs, wherein the energy storage device does not supply power to the first subset;
    light bulb socket compatible with at least one industry standard for light bulb sockets; and
    wherein the light bulb base is compatible with the light bulb socket.

24. The lighting system of claim 23, wherein the energy storage device is charged via power supplied by the one or more light bulb electrical contacts.

25. The lighting system of claim 23, wherein power to the second subset of LEDs is configurable to be supplied via the one or more light bulb electrical contacts.

26. The lighting system of claim 23, further comprising a rectifier to convert power supplied via the one or more right bulb electrical contacts from AC to DC.

* * * * *